United States Patent [19]

Baba et al.

[11] Patent Number: 4,841,407
[45] Date of Patent: Jun. 20, 1989

[54] MAGNETIC FIELD GENERATOR HAVING A PLURALITY OF COILS FOR GENERATING MAGNETIC FIELD IN SUBSTANTIALLY THE SAME SPACE AND METHOD OF DRIVING THE SAME

[75] Inventors: Hisatoshi Baba; Naoki Imokawa; Makoto Shiho, all of Yokohama, Japan

[73] Assignee: Canon Kabushiki Kaisha, Tokyo, Japan

[21] Appl. No.: 60,303

[22] Filed: Jun. 10, 1987

[30] Foreign Application Priority Data

Jun. 16, 1986 [JP] Japan .................. 61-138346
Dec. 24, 1986 [JP] Japan .................. 61-306221
Dec. 24, 1986 [JP] Japan .................. 61-306222

[51] Int. Cl.$^4$ .................. H01H 47/00; H01H 47/26
[52] U.S. Cl. .................. 361/146; 361/210
[58] Field of Search .................. 361/146, 151, 155, 210

[56] References Cited

U.S. PATENT DOCUMENTS 2,472,553  6/1949  Theunissen .................. 361/154
4,065,096  12/1977  Frantz et al. .................. 361/210
4,597,018  6/1986  Sonobe et al. .................. 358/296

Primary Examiner—L. T. Hix
Assistant Examiner—David Porterfield
Attorney, Agent, or Firm—Fitzpatrick, Cella, Harper & Scinto

[57] ABSTRACT

A magnetic field generator includes: a first coil group, including at least one coil, for generating a magnetic field upon energization; a second coil group, including at least one coil, and arranged such that a magnetic field is generated in substantially the same space as that of the magnetic field generated by the first coil group, a self-inductance of the second coil group being smaller than that of the first coil group; and a driving means for selectively energizing the first and second coil groups. The driving means energizes the second coil group first, and after the magnetic field is caused to rise by the second coil group, energizes the first coil group, thereby holding a constant magnetic field. A method of driving a magnetic field generator including a first coil group for generating a magnetic field and a second coil group for generating a magnetic field in substantially the same space as that of the magnetic field generated by the first coil group and having a self-inductance smaller than that of the first coil group, includes the steps of: energizing only the second coil group to generate a magnetic field; and energizing the first coil group after the magnetic field generated by the second coil group rises, thereby holding a constant magnetic field.

11 Claims, 5 Drawing Sheets

MAGNETIC FIELD GENERATOR HAVING A PLURALITY OF COILS FOR GENERATING MAGNETIC FIELD IN SUBSTANTIALLY THE SAME SPACE AND METHOD OF DRIVING THE SAME

BACKGROUND OF THE INVENTION

1. Field of the Invention

The present invention relates to a magnetic field generator and a method of driving the same and, more particularly, to a magnetic field generator suitably used as a biasing magnetic field generating means of an optomagnetic data (information) recorder and capable of switching the direction of a magnetic field at a high speed and to a method of driving the magnetic field generator.

2. Description of the Prior Art

An electromagnetic converter using an electromagnet is conventionally known as a device for generating a magnetic field.

Such a magnetic field generating means is used as a magnetic head of a tape recorder and the like. In this case, since the magnetic head and a tape are brought into contact with each other to record/reproduce data, a high magnetic flux density need only to be obtained near the magnetic head. Therefore, the device can be made small in size, and a good response of the electromagnet can be obtained. In addition, since magnetic fluxes can be concentrated by adjusting a gap and the like between both right and left poles of the magnetic head, a high magnetic flux density can be obtained even if the device is made small in size.

On the other hand, in an optomagnetic recorder which has been recently noted as a large capacity data memory, the above magnetic field generator is used to obtain a biasing magnetic field during recording or erasing of data. For example, U.S. Pat. No. 4,597,018 describes an optomagnetic recorder including a magnetic field generating means. In addition, U.S. application Ser. No. 866,314 filed May 23, 1986 assigned to the same assignee describes a process of data recording by applying a biasing magnetic field. Furthermore, U.S. application Ser. No. 620,808 filed June 14, 1984 (now U.S. Pat. No. 4,686,661), Ser. No. 904,453 filed Sept. 8, 1986, and Ser. No. 907,749 filed Sept. 16, 1986, all assigned to the same assignee as the present invention, describe an example of a magnetic field generator using an electromagnet.

In such a magnetic field generator used in an optomagnetic data recorder, a magnetic flux density having a magnetic field of several hundreds to several kOe is required even at a position apart from an electromagnet by several mm. This is because it is difficult to move a magnetizing medium within a range of about 2 mm to the electromagnet since the magnetizing medium is located inside of the magnetic disk surface by about 1.2 mm and when the disk is rotated, the disk surface is vertically moved by about 1 mm due to vibration.

Therefore, in the optomagnetic data recorder, a relatively large electromagnet must be used to obtain a predetermined magnetic flux density.

In addition, in the optomagnetic data recorder, the direction of a biasing magnetic field must be switched between data recording/reproducing operations. If this recording/reproducing switching operation is not performed rapidly, a data transfer speed is undesirably decreased. For this reason, according to a conventional driving method, a high voltage is applied across a coil of an electromagnet to cause a magnetic field to rise, and then the voltage is decreased to hold a constant magnetic field.

In such an electromagnet, in order to switch a magnetic field at a high speed, a coil having a large diameter wire with a small number of turns must be used, and a large current must be flowed therethrough. On the other hand, a large ampere-turn is necessary to hold a large magnetic flux. When a small current is flowed to suppress heat generation, the number of turns of the coil must be increased. However, according to the above-mentioned electromagnet, the magnetic field is switched and held by a single coil. Therefore, when the number of turns of the coil is increased, a high voltage power source is required, thereby increasing a power consumption at a driving stage. On the contrary, when the number of turns of the coil is decreased, a power consumption of the electromagnet is increased, thereby increasing the amount of generated heat.

SUMMARY OF THE INVENTION

In order to eliminate the above drawbacks, it is an object of the present invention to provide a magnetic field generator and a method of driving the same, capable of switching the direction of a magnetic field at a high speed and holding a high magnetic field intensity while minimizing a power consumption and heat generation.

The above object of the present invention is achieved by a magnetic field generator comprising: a first coil group, including at least one coil, for generating a magnetic field upon energization; a second coil group, including at least one coil, arranged to generate a magnetic field upon energization in substantially the same space as the first coil, and having a self-inductance smaller than that of the first coil; and a driving means for selectively energizing the first and second coil groups. Such a magnetic field generator is driven such that the second coil group is energized first, and after a magnetic field is caused to rise by the second coil group, the first coil group is energized, thereby holding a constant magnetic field.

DETAILED DESCRIPTION OF THE PREFERRED EMBODIMENTS

Embodiments of the present invention will now be described in detail with reference to the accompanying drawings.

Figure 1:
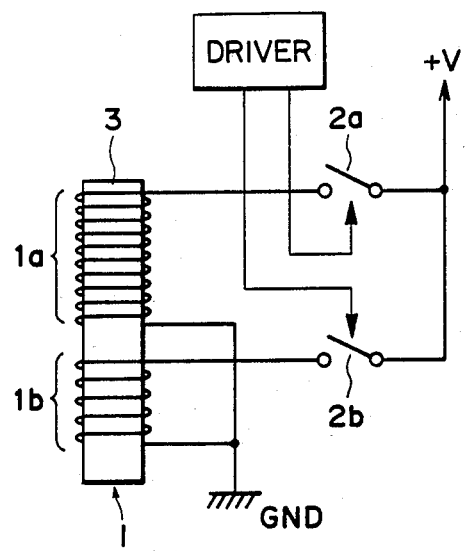
FIG. 1 is a schematic view of an embodiment of a magnetic field generator according to the present invention.

FIG. 1 is a schematic view of an embodiment of the magnetic field generator according to the present invention. In FIG. 1, an electromagnet 1 includes a first coil 1a and a second coil 1b. The second coil 1b is first coil 1a and a second coil 1b. The second coil 1b is used to cause a magnetic field to rise and is wound around a yoke 3 by the number of turns smaller than that of the first coil 1a.

In addition, as shown in FIG. 1, the first and second coils 1a and 1b are connected to each other through first and second switches 2a and 2b, respectively, and one end of the connected coils is grounded and the other end thereof can be applied with a voltage $+V$.

In order to generate a magnetic field by the generator with the above arrangement, the second switch 2b is turned on first to flow a current through the second coil 1b.

Since the second coil 1b has an inductance and a DC resistance smaller than those of the first coil 1a, the current abruptly flows when the voltage $+V$ is applied thereto. Thus, a magnetic field generated in the electromagnet 1 abruptly rises. Then, after a predetermined time interval or after it is detected that the magnetic field generated by the second coil 1b or the current flowing therethrough reaches a specific level, the first switch 2a is turned on and the second switch 2b is turned off to flow a current through the first coil 1a, thereby holding a magnetic field generated from the electromagnet 1. In accordance with a magnetic field intensity to be held, the numbers of turns of the first and second coils 1a and 1b, the DC resistance, or the voltage $+V$ are set property. The first and second switches 2a and 2b are opened/closed by a controller (not shown).

Figure 2:
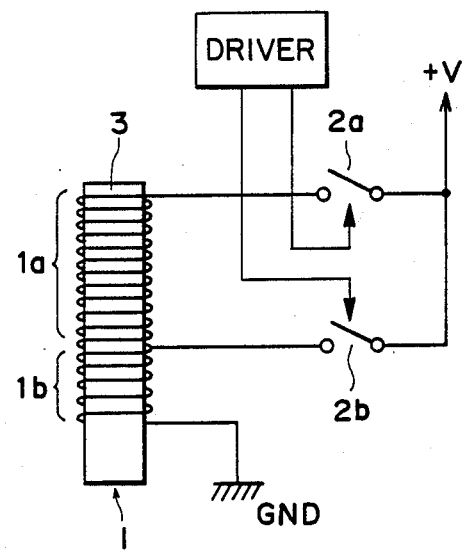
FIGS. 2 and 3 are respectively schematic views of other embodiments of the present invention.

FIG. 2 is a schematic view of another embodiment of the present invention. In FIG. 2, the first and second coils 1a and 1b are continuously wound around the yoke 3, and the second switch 2b is connected to a position at which the number of turns of the second coil 1b is smaller than that of the first coil 1a. The second switch 2b is coupled to the first switch 2a connected to the end of the first coil 1a so as to be applied with the voltage $+V$. In addition, the end of the second coil 1b is grounded.

An operation of the second embodiment is similar to that of the first embodiment. However, in the second embodiment, after the first switch 2a is turned on and the second switch 2b is turned off as described in the first embodiment, a current flows through the first and second coils 1a and 1b, thereby holding a magnetic field generated from the electromagnet 1.

Still another embodiment of the present invention in which transistors are used as switches to invert a magnetic field will now be described below with reference to FIGS. 3 and 4.

Figure 3:
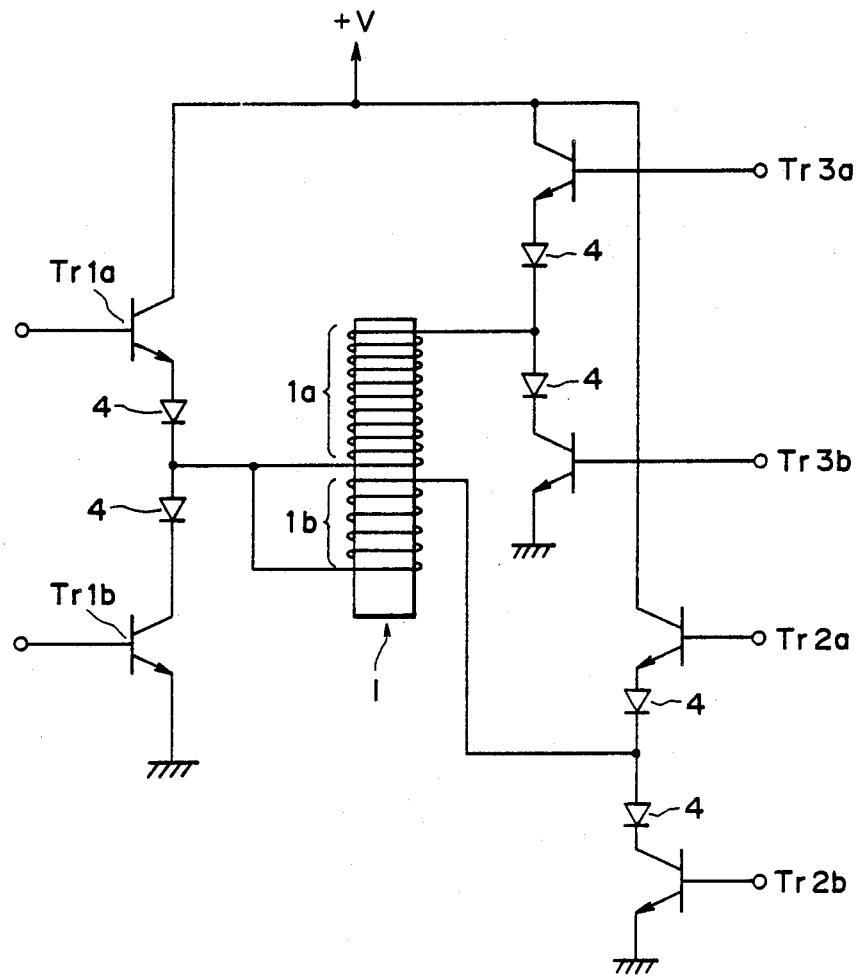
Figure 4:
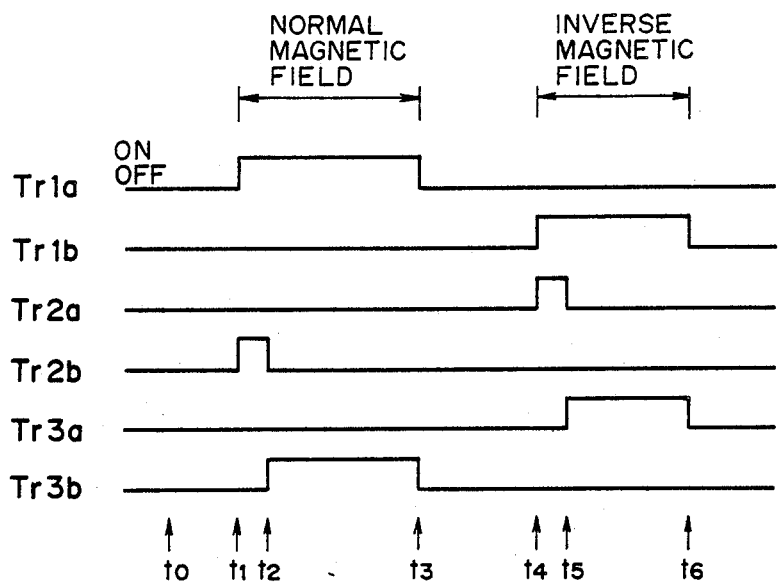
FIG. 4 is a timing chart for explaining a method of driving the magnetic field generator shown in FIG. 3.

In FIG. 3, an electromagnet 1 includes a first coil 1a and a second coil 1b. The second coil 1b is wound around a yoke 3 by the number of turns smaller than that of the first coil 1a, thereby obtaining the same effect as that of the above two embodiments. Transistors Tr1a, Tr1b, Tr2a, Tr2b, Tr3a, and Tr3b are driven by a controller (not shown) to perform a switching operation. Diodes 4 are connected between each pair of the above transistors.

An operation of the third embodiment having the above arrangement will be described below with reference to a timing chart shown in FIG. 4.

At time t0, all the transistors are in an OFF state, so that no current flows through the coils and no magnetic field is generated. Then, in order to generate a normal magnetic field (a magnetic flux is generated upward with connections in FIG. 3) at time t1, the transistors Tr1a and Tr2b are turned on, and a voltage is applied to the second coil 1b. At time t2 at which a desired magnetic flux density is obtained, the transistor Tr3b is turned on and the transistor Tr2b is turned off, thereby energizing the first coil 1a to hold the magnetic field. The transistor Tr3b is turned off at time t3, so that the magnetic field disappears.

Similarly, in order to generate a magnetic field in a reverse direction at time t4, the transistors Tr1b and Tr2a are turned on, and a voltage in a reverse direction is applied to the second coil 1b to cause an inverse magnetic field to rise. Thereafter, at time t5, the transistor Tr3a is turned on and the transistor Tr2a is turned on, thereby obtaining a constant magnetic field in the reverse direction. The transistors are turned off at time t6, so that the magnetic field disappears.

Note that the diodes 4 in FIG. 3 are provided to prevent an induced voltage generated along with a change in the magnetic field of the electromagnet 1.

In addition, when the transistors perform a complete switching operation, a very high induced voltage is generated when the magnetic field disappears. Therefore, a switching time during disappearance of the magnetic field may be prolonged to prevent this. In order to obtain a difference between magnetic flux densities in the normal and inverse directions, a suitable resistor may be inserted at the output side of the transistor.

Figure 5:
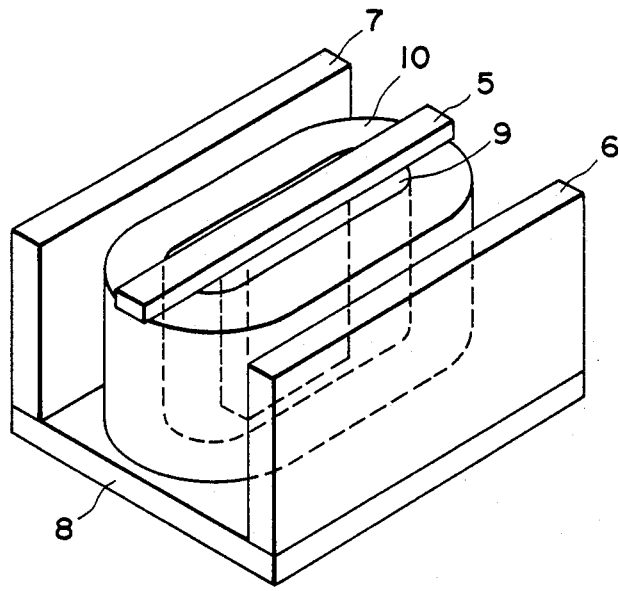
FIG. 5 is a schematic perspective view of an arrangement of the magnetic field generator according to the present invention.

An arrangement of the above embodiment will be described in detail with reference to FIG. 5. FIG. 5 is a schematic perspective view of an arrangement of the magnetic field generator according to the present invention.

In FIG. 5, side yokes 6 and 7 are provided at both sides of a main yoke 5. One end of each of the main yoke 5 and the side yokes 6 and 7 is coupled to a plate yoke 8. An inner coil 9 for causing a magnetic field to rise is wound around the main yoke 5, and an outer coil 10 for holding the magnetic field is wound therearound. The inner and outer coils 9 and 10 correspond to the second and first coils, respectively, in the above-mentioned embodiment for explaining a principle of the present invention (to be referred to as a principle example hereinafter), and the number of turns of the outer coil 10 is larger than that of the inner coil 9. The main yoke 5 is T-shaped as shown in FIG. 5 to facilitate winding of the inner and outer coils 9 and 10.

In the above embodiment, the inner coil 9 corresponds to the second coil in the principle example, and the outer coil 10 corresponds to the first coil therein. Therefore, by connecting the switching circuit used in the principle example to the inner and outer coils 9 and 10, the magnetic field can rise at a high speed and can be held as in the principle example.

On the other hand, in this embodiment, the inner coil with a smaller number of turns is located closer to the main yoke 5 than the outer coil 10 is, and the outer coil 10 is provided outside the inner coil 9. With this arrangement, the inner coil 9 advantageously has a smaller DC resistance and a lower inductance than those of the outer coil 10. As a result, the inner coil 9 effectively causes the magnetic field to rise fast. Note that the outer coil 10 need only hold a predetermined magnetic field. Therefore, in order to reduce a power consumption and heat generation, the number of turns is increased and a current to be flowed through the coil is decreased, thereby obtaining a large ampere-turn.

Figure 6:
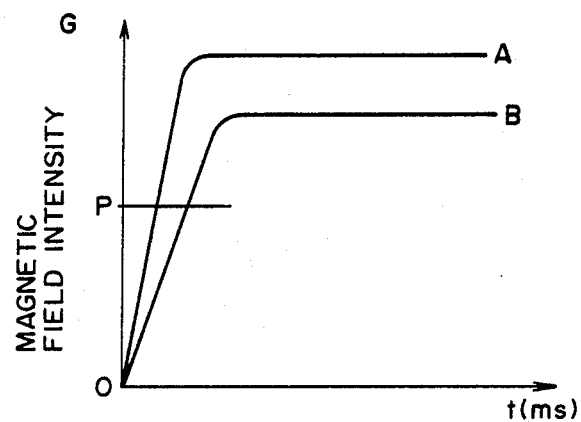
FIG. 6 is a graph showing a difference between a magnetic field rise time of the present invention and that of a conventional generator.

FIG. 6 shows a comparison between the case wherein a plurality of coils are disposed in parallel along a magnetic field direction and the case wherein a coil for causing a magnetic field to rise is disposed inside a coil for holding the magnetic field. In FIG. 6, the abscissa represents a rise time of the magnetic field and the ordinate represents a magnetic field intensity according to the generator A of this embodiment and a conventional generator B. As shown in FIG. 6, it can be understood that a time required for the generator A to generate a magnetic field having a magnetic flux density of P gauss is substantially half that required for the generator B.

According to the magnetic field generator of this embodiment having the above arrangement, a cross-sectional area and the number of turns of a wire used for the second coil 9 are so set as to reduce a rise time when a magnetic field is generated and a magnetic field direction is inverted. This will be described below.

Figure 7:
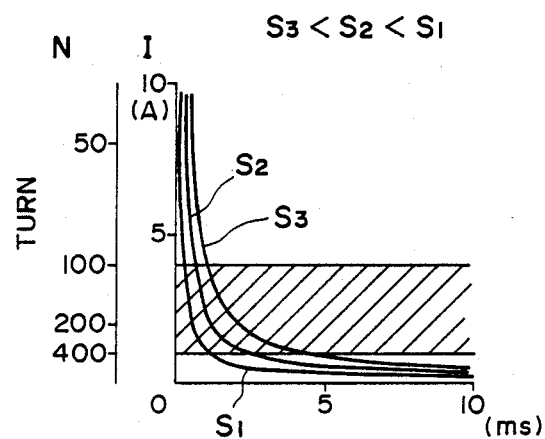
FIG. 7 is a graph showing a relationship between the number of turns of a coil used in the present invention and the magnetic field rise time.
Figure 8:
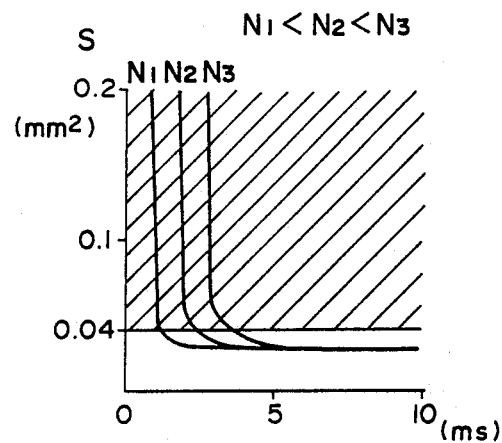
FIG. 8 is a graph showing a relationship between a cross-sectional area of a coil wire used in the present invention and the magnetic field rise time.

A transient response obtained when a current flows through a coil is generally represented by the following equation:

$$I = (V/R)(1 - e^{-(R/L)t}) \ldots \quad (1)$$

where V is a voltage applied across a coil; R is a resistance of the coil; L is an inductance of the coil; and t is time. On the basis of equation (1), FIGS. 7 and 8 show the relationships between a cross-sectional area S of the coil wire, the number of turns N of the coil, a rise time t, and the like. In FIG. 7, the abscissa represents the rise time t, and the ordinate represents the number of turns N and a value of a maximum current I flowing through the coil. That is, the ordinate represents an ampere-turn, but the number of turns N and the maximum current I corresponding thereto are given values. Note that the values shown in FIG. 7 are obtained when a coil is wound in a single layer around a yoke with a predetermined length. In addition, a relationship between values of the cross-sectional area S is $S3 < S2 < S1$.

As shown in FIG. 7, the rise time t is inversely proportional to the number of turns N of the coil and the maximum current I. Therefore, in order to reduce the rise time t, the number of turns N may be decreased. However, if the number of turns N is decreased too much, a large current flows and a power consumption is increased. On the other hand, when the number of turns N is 100 or less, the rise time t is not reduced very much while the current I is largely increased. On the contrary, when the number of turns N is 400 or more, the rise time t is undesirably abruptly increased. Therefore, the number of turns N may be selected to fall within a range defined by the following relation, as shown in a hatched line region in FIG. 7:

$$100 \leq N \leq 400 \quad (2)$$

FIG. 8 is a graph in which the number of turns N is used as a parameter, the rise time t is plotted along the abscissa, and the cross-sectional area S of the coil wire is plotted along the ordinate. Note that similar to the case shown in FIG. 7, FIG. 8 shows the case wherein a coil is wound in a single layer around a yoke with a predetermined length. In addition, a relationship between values of the number of turns N is $N1 < N2 < N3$.

As shown in FIG. 8, when the cross-sectional area S of the coil wire is less than 0.04 mm$^2$, the rise time t is abruptly increased, and when it is more than 0.04 mm$^2$, the rise time t is gradually decreased. Therefore, the cross-sectional area S (mm$^2$) of the coil wire may be selected to fall within a range defined by the following relation, as shown in a hatched line region in FIG. 8:

$$0.04 \leq S \quad (3)$$

When a coil wire of a circular cross-section is used, its diameter d (mm) is obtained as follows:

$$0.226 \leq d \quad (4)$$

As described above, as the second coil 9 in the magnetic field generator of this embodiment, a coil having the cross-sectional area S (mm$^2$) and the number of turns N which are represented by the following relations is desirably used:

$$100 \leq N \leq 400 \text{ and } 0.04 \leq S$$

As a result, according to the generator of this embodiment, the rise time is extremely decreased when the magnetic field is generated and the magnetic direction is inversed. However, a coil wire is normally wound around in a plurality of layers. Therefore, when the cross-sectional area S of the coil wire is increased, the resistance of the coil may be undesirably increased to be larger than that shown in FIG. 7. In addition, when the number of turns of the coil is maintained constant and the cross-sectional area thereof is increased, the size and weight of the generator of this embodiment are undesirably increased. Therefore, if the cross-sectional area and the number of turns of the coil wire S are selected in consideration of the above situation and in correspondence to performance of the generator required as needed, a high rise speed of the magnetic field, a low power consumption, and a small size of the generator can be achieved at the same time.

Figure 9:
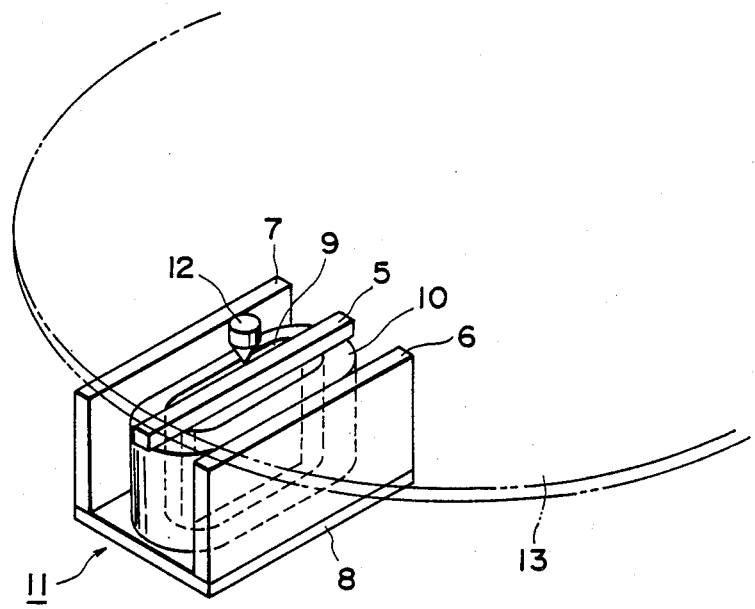
FIG. 9 is a schematic perspective view of an example in which the magnetic field generator of the present invention is used in an optomagnetic data recorder.

As has been described above, the magnetic field generator according to the present invention can be especially suitably used as a biasing magnetic field generating means of an optomagnetic data recorder. FIG. 9 shows an example of such an optomagnetic data recorder. In FIG. 9, the same parts as in FIG. 5 are denoted by the same reference numerals, and a detailed description thereof will be omitted.

In FIG. 9, a magnetic field generator 11 according to the present invention is arranged such that the generator 11 is located at a side opposite to that at which an optical head 12 is located with respect to an optomagnetic disk 13, and that the longitudinal direction of a main yoke 5 coincides with the radial direction of the optomagnetic disk 13. The optical head 12 includes a light source such as a semiconductor laser and an objective lens for focusing a light beam emitted from the light source onto the optomagnetic disk 13. The optical head 12 is moved in the radial direction of the optomagnetic disk by a mechanism (not shown).

Various modifications of the present invention may be made in addition to the embodiments described above. For example, as a switching circuit used in the present invention, the above-mentioned circuit including transistors can be naturally used, but a circuit including a VFET, a GTO thyristor, and the like as other switching elements may be used.

In addition, in the above embodiments, a description has been made with reference to the case wherein two coils are used, but the number of coils may be increased. Furthermore, when power sources having set voltages different from each other are used for the first ad second coils, respectively, and a voltage applied to the second coil is higher than that applied to the first coil, a ratio of the numbers of turns of the respective coils need not be increased very much, thereby advantageously reducing an induced voltage.

Moreover, in the above embodiments, the numbers of turns of the first and second coils are different from each other so that an inductance of the second coil is smaller than that of the first coil. However, in order to achieve this, a conductive wire having a cross-sectional area larger than that of the first coil may be used for the second coil to reduce a resistance value.

The present invention includes all the modifications as described above as long as they do not depart from the scope of claims.

We claim:

1. A bias magnetic field generator for an optomagnetic information recording apparatus comprising:
   a first coil group, including at least one coil, for generating a magnetic field upon energization;
   a second coil group, including at least one coil, and arranged such that a magnetic field is generated in substantially the same space as that of the magnetic field generated by said first coil group, a self-inductance of said second coil group being smaller than that of said first coil group; and
   driving means for selectively energizing said first and second coil groups, said driving means energizing said second coil group first, and when the magnetic field intensity of said second coil group reaches a predetermined value, energizing said first coil group, thereby keeping the magnetic field intensity at the predetermined value.

2. A generator according to claim 1, wherein said driving means includes a voltage source connected to said first and second coil groups respectively through switching circuits.

3. A generator according to claim 1, wherein said first and second coil groups are connected to different voltage sources, respectively.

4. A generator according to claim 1, wherein the number of turns of said first coil group is larger than that of said second coil group.

5. A generator according to claim 4, wherein said coils of said first and second coil groups are wound around a same single yoke such that said coil of said second coil group is located inside of said coil of said first coil group.

6. A generator according to claim 1, wherein the numbers of turns N of the coil of said second coil group satisfies the following relation:

$$100 \leq N \leq 400.$$

7. A generator according to claim 1, wherein a cross-sectional area of a conductive wire used for the coil of said second coil group is 0.04 ($mm^2$) or more.

8. A method of driving a bias magnetic field generator for an optomagnetic information recording apparatus including a first coil group for generating a magnetic field and a second coil group for generating a magnetic field in substantially the same space as that of the magnetic field generated by said first coil group and having a self-inductance smaller than that of said first coil group, comprising the steps of:
   energizing only said second coil group to generate a magnetic field; and
   energizing said first coil group when the intensity of the magnetic field generated by said second coil group reaches a predetermined value, thereby keeping the magnetic field intensity at the predetermined value.

9. A method according to claim 8, further comprising the step of:
   terminating energization of said second coil group after starting energization of said first coil group.

10. A method according to claim 8, wherein said first coil group is energized in a predetermined time interval after said second coil group is energized.

11. A method according to claim 8, wherein a voltage applied to energize said second coil group is higher than that applied to energize said first coil group.

* * * * *